Patented Apr. 20, 1943

2,316,912

UNITED STATES PATENT OFFICE 2,316,912

TOLYLETHYL BUTYRATE AND PROCESS FOR MAKING SAME

Frank J. Soday, Swarthmore, Pa., assignor to The United Gas Improvement Company, a corporation of Pennsylvania No Drawing. Application January 11, 1940, Serial No. 313,342

5 Claims. (Cl. 260—488)

In general, this invention relates to tolylethyl esters of butyric acids and to the preparation thereof from tolylethyl derivatives containing substituent groups capable of being replaced with an ester group corresponding to the desired butyric acid.

In my earlier copending application Serial Number 290,502, filed August 16, 1939, I have disclosed and claimed para tolylethyl acetate and its preparation. In this application I disclose and claim the tolylethyl esters of butyric acids.

The tolylethyl esters of the butyric acids may alternatively be designated as tolylethyl butyrates.

The tolylethyl esters of the present invention may be prepared in several isomeric forms. For example, both alpha and beta tolylethyl esters may be prepared by the processes hereinafter described. Furthermore, either ortho-, meta-, or para-tolylethyl esters may be prepared by my processes.

The butyric acids comprise the two isomeric forms, namely, $CH_3.CH_2.CH_2.COOH$ and $$(CH_3)_2.CH.COOH$$

The tolylethyl esters of butyric acids are, generally speaking slightly viscous, colorless liquids with very pleasing odors.

They may be used as solvents and plasticizing agents for both natural and synthetic resins, plastics, and for coating films in general.

They may also be used as solvents in the formulation of coating compositions such as paints, lacquers, enamels and varnishes.

A particularly desirable application for my novel tolylethyl esters embraces their use in perfumes and cosmetic preparations in general. Because of their chemical stability and resistance to hydrolysis, they may be used for perfuming soap and similar materials.

In accordance with this invention, tolylethyl esters of butyric acids may be produced from tolylethyl derivatives obtained from any source. One convenient source of these derivatives comprises hydrocarbon fractions containing methyl styrene and obtained in the manufacture of artificial gas.

In various processes for the manufacture of artificial gas, such as oil gas, carburetted water gas, or coal gas, considerable quantities of tar are produced and the gas contains substantial quantities of readily condensible material.

Both condensates obtained from the artificial gas, and the light oil obtained upon distillation of the residual tar, constitute sources for many aromatic hydrocarbons. Included among these aromatic hydrocarbons are the unsaturated olefines, and in particular the methyl-substituted styrenes.

The methyl styrenes have the following general structural formula:

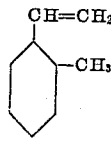 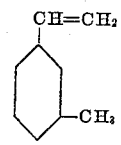 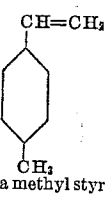

Ortho methyl styrene    Meta methyl styrene    Para methyl styren

These methyl styrenes may be readily converted into tolylethyl derivatives due to the unsaturated nature of the styryl radicals.

For example, para-methyl styrene may be readily converted into para-tolylethyl derivatives having the following general formula:

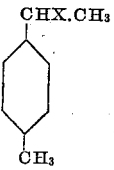 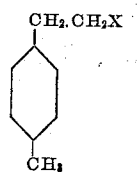

An alpha, para-tolylethyl derivative      A beta, para-tolylethyl derivative in which X represents a substituent atom or group.

Likewise, ortho and meta tolylethyl derivatives, both alpha and beta, may be prepared.

Included among such derivatives may be mentioned the tolylethyl hydrohalides, and the tolylethyl alcohols.

In my co-pending application Serial No. 433,334 filed Mar. 4, 1942, I have described a process by which a mixture of methyl styrenes may be converted into a mixture of tolylethyl hydrohalides by the direct addition of hydrogen halides to ortho, meta, and para methyl styrenes contained in said mixture. Both alpha and beta tolylethyl hydrohalides, and mixtures thereof, may be prepared by the processes therein described.

The tolylethyl hydrohalides thus prepared, may, if desired, be utilized for the production of tolylethyl esters of butyric acids by the processes hereinafter described.

In another co-pending application, Serial No. 290,501 filed August 16, 1939, which has matured into patent 2,293,774, dated Aug. 25, 1942; I have described processes for the preparation of tolylethyl alcohols from methyl styrene, and hydrocarbon fractions containing methyl styrene. Both alpha and beta alcohols of ortho, meta, and para tolyl ethane have been found to be highly suitable for the preparation of tolylethyl esters by the processes comprised in the present invention.

In the description which follows, the formation of para tolylethyl esters of butyric acids will be set forth in detail. It is to be understood, however, that the process is, in general, equally adaptable to the preparation of the ortho and meta tolylethyl esters, and that reference to the para tolylethyl esters is for convenience only in representing the class consisting of ortho, meta and para tolylethyl esters of butyric acids.

Coming now to the procedure contemplated by the present invention, I have found that when a tolylethyl derivative containing a substituent group in the ethyl radical capable of being replaced with an ester group corresponding to a desired butyric acid, is treated with a butyric acid or anhydride, or salts or derivatives thereof, the substituent group is replaced with an ester group, thus forming the tolylethyl ester of the desired butyric acid.

For example, when a para tolylethyl derivative having one of the following formulae

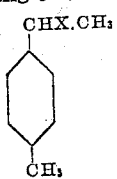

An alpha, para-tolylethyl derivative

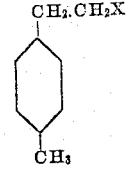

A beta, para-tolylethyl derivative is treated with a compound of this type, one or the other of the following reactions takes place depending upon the position of the substituent in the ethyl radical.

When an alpha derivative is employed, the reaction with n-butyric acid, for example, may be represented thus:

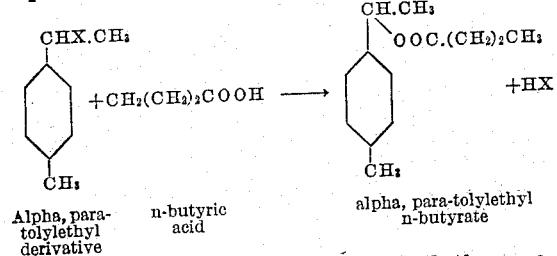

Alpha, para-tolylethyl derivative    n-butyric acid      alpha, para-tolylethyl n-butyrate When a beta derivative is employed, the reaction may be represented thus:

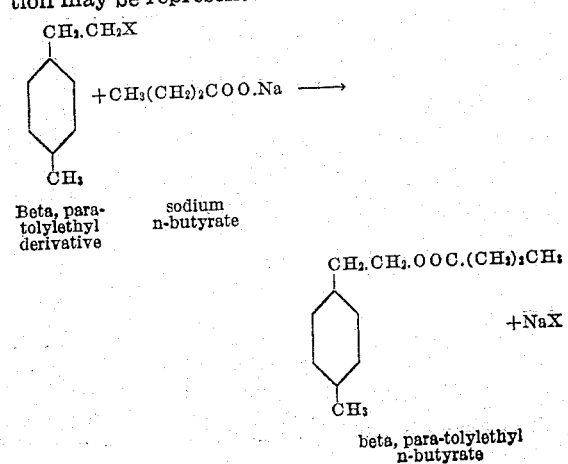

Beta, para-tolylethyl derivative    sodium n-butyrate beta, para-tolylethyl n-butyrate Other derivatives of the butyric acids, or mixtures thereof, may of course be employed.

The substituent atom or group represented by X in the foregoing formulae may be any group capable of being replaced by an ester group of butyric acid such as, for example, a halogen, an hydroxyl group, and the like.

The following equations illustrate the esterification of tolylethyl derivatives wherein the substituent constitutes a halogen atom to produce para tolylethyl butyrates.

For the production of alpha, para-tolylethyl butyrates the reaction may be represented as follows:

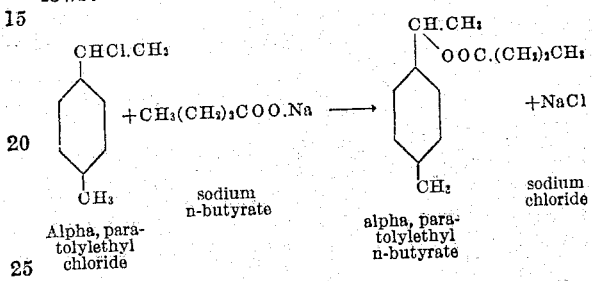

Alpha, para-tolylethyl chloride    sodium n-butyrate      alpha, para-tolylethyl n-butyrate    sodium chloride For the esterification of beta, para-tolylethyl chloride to form the corresponding beta, para-tolylethyl butyrate, the reaction may be represented as follows:

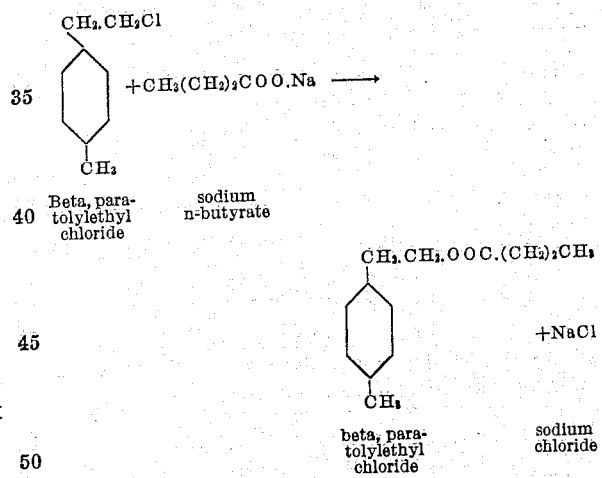

Beta, para-tolylethyl chloride    sodium n-butyrate beta, para-tolylethyl chloride    sodium chloride Illustrative of tolylethyl derivatives in which the substituent is a hydroxyl group, may be mentioned the para-tolylethyl alcohols having the following general formulae:

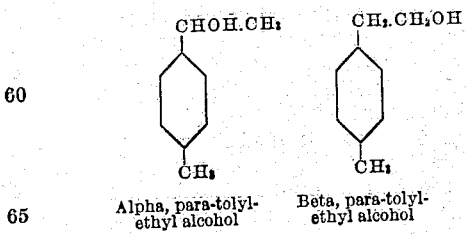

Alpha, para-tolyl-ethyl alcohol    Beta, para-tolyl-ethyl alcohol

It is to be understood that these materials are illustrative only and that the tolylethyl derivatives may be ortho, meta, or para, and the substituent atom or group of the derivatives may be any atom or group capable of being replaced with an ester group of butyric acid.

The conversion of tolylethyl derivatives to tolylethyl esters of butyric acids may be carried out in any suitable manner, and with any suitable esterification apparatus.

Any suitable esterification reagent, such as a butyric acid, its anhydride or its salt, may be employed as desired.

For example, butyric acid may be employed for the conversion of tolylethyl alcohols to butyrates, and the salts of butyric acid may be used in the conversion of tolylethyl halides to butyrates.

Illustrative of the salts of butyric acid which may be employed as esterification reagents may be mentioned sodium butyrate, potassium butyrate, calcium butyrate, iron butyrate, lead butyrate and other salts.

The esterification reaction may be carried out in the presence of a solvent, such as for example, benzene, if desired.

Any suitable reaction temperature may be employed, such as for example, the boiling point of the solution.

The esterification reaction may be carried out at atmospheric subatmospheric, or superatmospheric pressures, as desired.

Suitable esterification catalysts, such as, for example, sulfuric acid, phosphoric acid or anhydrous hydrogen chloride, may be advantageously employed in certain of the reactions, particularly in the conversion of tolylethyl alcohols to esters of butyric acids.

The use of a system whereby any water formed by the esterification reaction can be continuously removed from the system will, in general, be found advantageous from the standpoint of the yield of ester secured, as well as from the standpoint of the considerable reduction in time necessary to complete the reaction.

One suitable method for effecting the esterification processes of the present invention comprises refluxing the derivatives with esterification reagents for a period of several hours.

For example, salts of butyric acids may be refluxed with tolylethyl halides to produce the corresponding tolylethyl esters. This reaction may, if desired, be effected in the presence of the corresponding acid.

The tolylethyl esters thus produced may be suitably separated from the halogen salts in the reaction mixture, for example, by filtration.

If a butyric acid has been employed in the reaction, it may be removed by distillation under reduced pressure. Any unremoved acid may then be neutralized with an alkaline solution.

The tolylethyl esters obtained by the processes herein described may be isolated and purified in any desired manner.

For example, the reaction mixture may, if desired, be repeatedly extracted with any suitable solvent, such as ether or benzene, to increase the yield and purity of the tolylethyl esters therein.

The extracts may then be combined and dried over a drying agent such as, for example, anhydrous sodium sulfate, after which the extraction solvent employed may be removed by distillation at atmospheric pressure. The residue may then be fractionally distilled in vacuo to obtain a purified tolylethyl ester of a butyric acid.

Mixtures of alpha and beta tolylethyl derivatives, in any proportion, may be employed in the preparation of mixtures of alpha and beta tolylethyl esters of butyric acids.

Such mixtures of the alpha and beta forms of para tolylethyl esters of butyric acids may be desired in order to obtain a product possessing a desired boiling range, or desired volatility characteristics, or other desired properties.

For example, a mixture containing the desired proportion of each of the isomeric forms of tolylethyl halides may be reacted with a salt of a butyric acid to obtain a tolylethyl ester fraction containing the desired proportion of the isomeric forms of tolylethyl esters of the acid. Mixtures containing the desired proportion of alpha and beta tolylethyl halides suitable for use in my process may be obtained, for example, by adding a hydrogen halide to methyl styrene under the proper conditions to give the desired mixture of isomeric tolylethyl halides.

Similarly a mixture of the isomeric forms of other tolylethyl derivatives, such as, for example, the tolylethyl alcohols, in the desired proportions, may be esterified to obtain a tolylethyl ester fraction containing the desired proportion of the isomeric forms of tolylethyl esters of butyric acids. Also a mixture of butyric acids or anhydrides, or derivatives thereof, may be employed in the foregoing processes.

When mixtures of the isomeric forms of tolylethyl esters of butyric acids are obtained, they may, if desired, be separated into fractions containing the individual isomers, by any suitable method, such for example, as fractionation.

As illustrative of the methods of preparing various tolylethyl esters of butyric acids, the following examples are given:

*Example I*

An alpha, para-tolylethyl n-butyrate was prepared by the esterification of an alpha, para-tolylethyl chloride fraction, having the following general formula and physical properties:

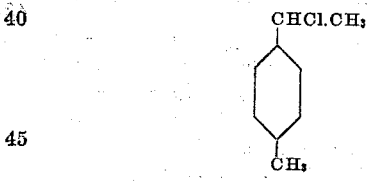

Boiling point=56.0 to 62.0° C. at 2.5 mm.
Density ($d\ 20/4$) =1.0449
Refractive index ($n\ 20/d$) =1.5298

The esterification was effected by the following procedure.

A solution of potassium butyrate in butyric acid was made by stirring 284 grams (2.25 mols) of freshly prepared potassium butyrate into 300 grams of hot n-butyric acid contained in a 2-liter round bottom flask fitted with a reflux condenser. To this solution was added 232 grams (1.5 mols) of alpha para-tolylethyl chloride, and the mixture was refluxed with stirring for three hours on an oil bath heated to 140–150° C.

The reaction mixture was then cooled and filtered to remove the potassium chloride formed, as well as the excess potassium n-butyrate present, after which it was distilled under reduced pressure. The residue containing the desired ester and the remaining portions of the excess potassium butyrate were then treated with a 10%-solution of sodium bicarbonate and extracted with ether. The ether extract was then dried with anhydrous sodium sulfate, after which the ether was removed by distillation at atmospheric pressure. The residue was distilled under reduced pressure, whereupon there was obtained approximately 233 parts by weight of alpha, para-tolylethyl n-butyrate having the following general structural formula and physical properties:

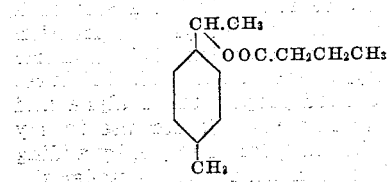

Boiling point = 103° C. at 2 mm.
Density ($d\ 20/4$) = 0.9795
Refractive index ($n\ 20/d$) = 1.48880

This ester was a colorless, somewhat viscous liquid with a flowery ester odor.

*Example II*

Beta, para-tolylethyl n-butyrate was prepared by the esterification of beta, para-tolylethyl bromide, having the following general structural formula and physical properties:

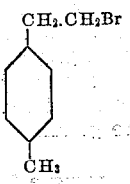

Boiling point = 84–85° C. at 4 mm.
= 101–102° C. at 10 mm.
Density ($d\ 20/4$) = 1.3096
Refractive index ($n\ 20/d$) = 1.55519

This esterification was effected in the following manner:

A solution of potassium butyrate in n-butyric acid was first made by stirring 189 grams (1.5 mols) of the fused salt into 250 grams of anhydrous butyric acid heated to 100° C. When a clear, syrupy solution was obtained, 199 grams (1 mol) of beta, para-tolylethyl bromide was added slowly through the reflux condenser and the temperature gradually raised to 160° C. This mixture was then refluxed for seven hours on an oil bath heated to approximately 160° C. After cooling, the reaction mixture was filtered by suction to remove the excess potassium butyrate and the potassium bromide formed during the reaction. The filtrate thus obtained was then distilled under reduced pressure to remove the major portion of the unchanged butyric acid, after which it was neutralized in the cold with a 10% sodium bicarbonate solution.

The neutralized material was then extracted with ether, and the extracts combined and dried over anhydrous sodium sulfate. The potassium bromide and excess potassium butyrate was dissolved in cold water and extracted twice with ether to recover the small amount of ester which had been absorbed by the filter cake. The ethereal extract was combined with the crude ester, after neutralizing with sodium bicarbonate and drying over anhydrous sodium sulphate.

The ether contained in the dried neutralized material was then removed by distillation at atmospheric pressure, after which the residue was distilled in vacuo. There was obtained approximately 165 parts by weight of beta, para-tolylethyl n-butyrate, having the following general structural formula and physical properties.

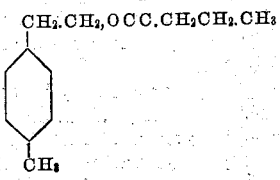

Boiling point = 97–98° C. at 1 mm.
Density ($d\ 20/4$) = 0.9834
Refractive index ($n\ 20/d$) = 1.49021

The preparation of the corresponding derivatives of isobutyric acid is illustrated by the following examples:

*Example III*

A solution of potassium isobutyrate in isobutyric acid was first made by stirring 190 grams (1.5 mols) of freshly fused potassium isobutyrate into 300 grams of anhydrous isobutyric acid heated to 90° C. When a clear syrup was obtained, 155 grams (1 mole) of an alpha-para-tolylethyl chloride:

(Boiling point = 75–82° at 7–8 mm.)

was run in slowly through the reflux condenser and the temperature was raised gradually to 140°. Stirring was continued for five hours during which time a fine precipitate of potassium chloride separated out as a by-product of the reaction. The cold reaction mixture was filtered by suction to remove the potassium chloride and excess potassium isobutyrate, and the clear filtrate was distilled under reduced pressure to remove most of the isobutyric acid. The residual acid was neutralized in the cold with sodium bicarbonate solution and the crude ester was extracted with ether, dried and distilled.

After removal of the ether, distillation in vacuo gave 146 grams of alpha, para-tolylethyl isobutyrate having the following general structural formula and physical properties:

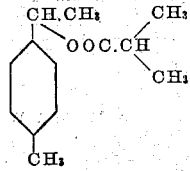

Boiling range = 106–112° at 6 mm.
Density ($d\ 20/4$) = 0.9749
Refractive index ($n\ 20/d$) = 1.48787

The yield was 70.9% of the theoretical amount based on the weight of alpha, para-tolylethyl chloride used.

This ester was obtained as a colorless, somewhat viscous liquid with an agreeable odor similar to that of the normal butyrate.

*Example IV*

A solution of potassium isobutyrate in isobutyric acid was made by adding 189 grams (1.5 moles) of the freshly fused potassium salt to 280 grams of the anhydrous acid heated to 100°. When a clear, syrupy solution was obtained, the temperature was raised to 160° and 199 grams (1 mole) of beta, para-tolylethyl bromide:

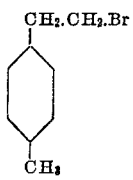

was added dropwise through the reflux condenser. This addition required 45 minutes and the stirring was continued for 12 hours with the temperature maintained at 160°. During this period of time the acid refluxed mildly and a fine suspension of potassium bromide separated out as a by-product of the reaction.

The reaction mixture was allowed to cool and filtered by suction to remove the potassium bromide and excess potassium isobutyrate. This solid material was dissolved in water and extracted with ether to recover any absorbed ester. The clear filtrate was distilled under reduced pressure to remove most of the isobutyric acid which came over at 37° C. at 5 mm. The above ether extract was then combined with the crude ester and the resulting solution was treated with an aqueous 10% sodium bicarbonate solution to neutralize the residual acid in the product. This mixture was extracted with ether, the extract dried with anhydrous sodium sulphate and distilled under reduced pressure.

Distillation gave 180 grams of beta, para-tolylethyl isobutyrate:

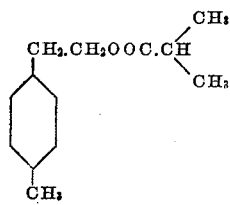

This compound was found to have the following physical properties:

Boiling range=87–90° at 1 mm.
  Density ($d$ 20/4) =0.9761
  Refractive index ($n$ 20/$d$) =1.48658

This weight of product corresponded to a yield of 87.3% of the ester, based on the amount of beta, para-tolylethyl bromide used in the esterification.

This compound was obtained as a colorless, somewhat viscous liquid with a very pleasant odor.

It will be appreciated, of course, that tolylethyl esters of butyric acids may be prepared from pure methyl styrene or hydrocarbon fractions containing methyl styrene by processes which may be conducted on a continual, continuous, semi-continuous or batch basis. For example, such a process may comprise first converting the methyl styrene into a tolylethyl derivative containing a substituent capable of being replaced with an ester group corresponding to the desired butyric acid, and thereafter effecting esterification of such a derivative.

For example, a para-tolylethyl halide may be prepared from a para-methyl styrene fraction obtained by the distillation of light oil from oil gas and this para-tolylethyl halide may then be esterified to form the para-tolylethyl ester of a butyric acid.

Likewise, a para-tolylethyl alcohol may be prepared from such a para-methyl styrene fraction, after which the para-tolylethyl alcohol may be converted into a para-tolylethyl ester of a butyric acid by esterification.

While representative tolylethyl esters of butyric acids and procedures for the preparation thereof have been particularly described, it is to be understood that these are by way of illustration only. Therefore, changes, omissions, additions, substitutions, and/or modifications may be made within the scope of the claims without departing from the spirit of the invention.

I claim:

1. A tolylethyl butyric ester having the following structural formula:

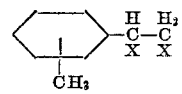

in which one X represents hydrogen and the other X represents $C_3H_7$—COO—.

2. A tolylethyl butyric ester having the following structural formula:

in which one X represents hydrogen and the other X represents $C_3H_7COO$—.

3. A tolylethyl butyric ester having the following structural formula:

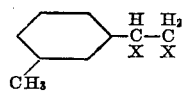

in which one X represents hydrogen and the other X represents $C_3H_7COO$—.

4. A tolylethyl butyric ester having the following structural formula:

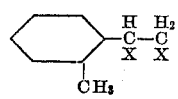

in which one X represents hydrogen and the other X represents $C_3H_7COO$—.

5. Alpha, para-tolylethyl n-butyrate having the following structural formula:

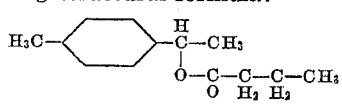

FRANK J. SODAY.